Aug. 25, 1936.                  E. PICK                      2,052,515
                      WATER SOFTENING APPARATUS
                    Filed Jan. 20, 1933          5 Sheets-Sheet 1

INVENTOR.
Eric Pick
BY
L. Bascom Smith
ATTORNEY

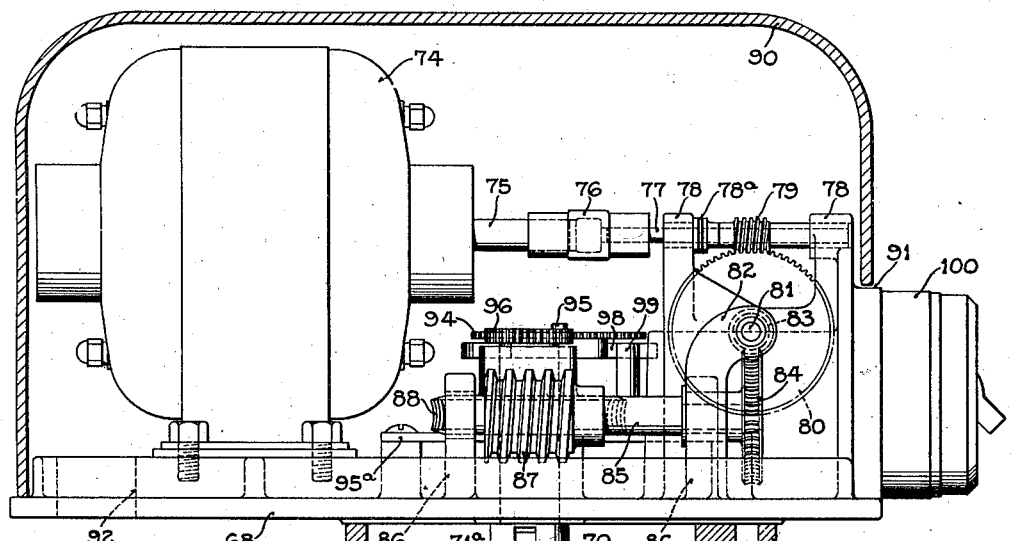
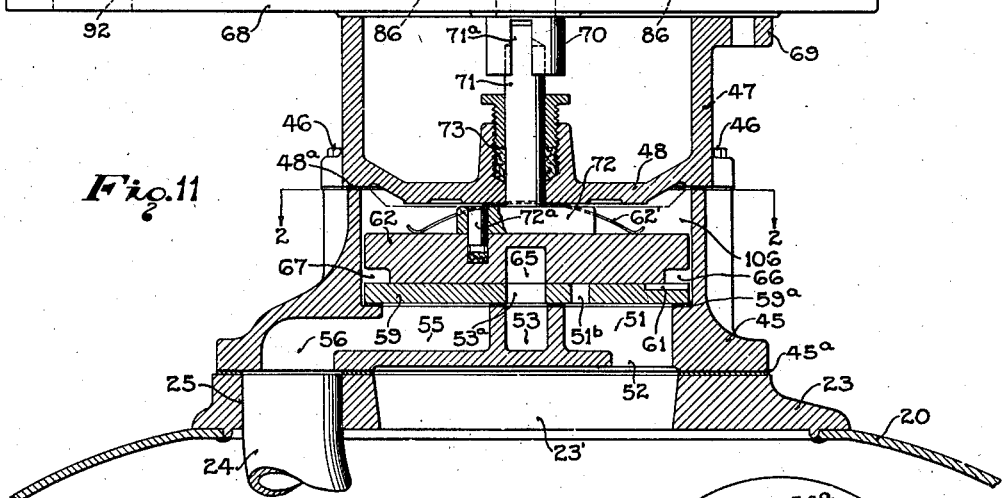
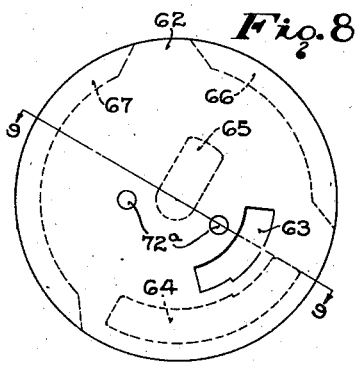
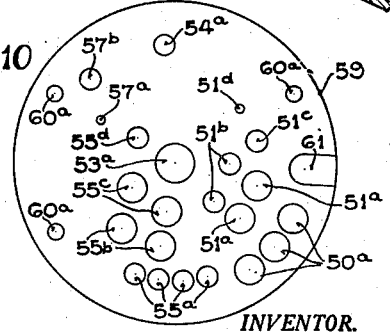

Aug. 25, 1936.  E. PICK  2,052,515
WATER SOFTENING APPARATUS
Filed Jan. 20, 1933   5 Sheets-Sheet 4

INVENTOR.
Eric Pick
BY
F. Bacon Smith
ATTORNEY

Aug. 25, 1936.　　　　　　　E. PICK　　　　　　　2,052,515
WATER SOFTENING APPARATUS
Filed Jan. 20, 1933　　　5 Sheets-Sheet 5
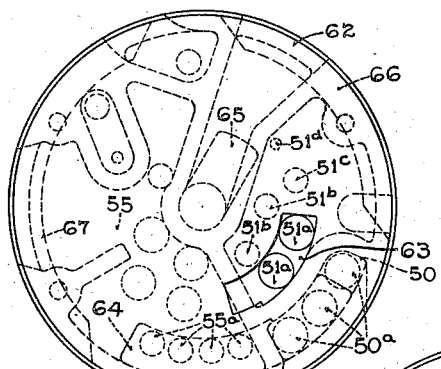
SOFTENING-0°
Fig.15
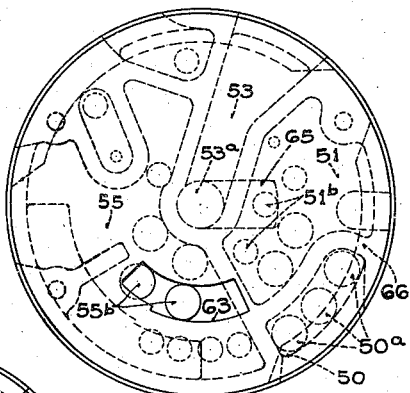
BACKWASHING-60°
Fig.16
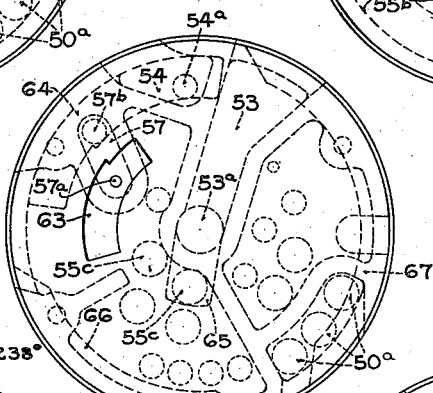
REGENERATION-160°
Fig.17
Fig.18
FLUSHING BRINE LINE-238°
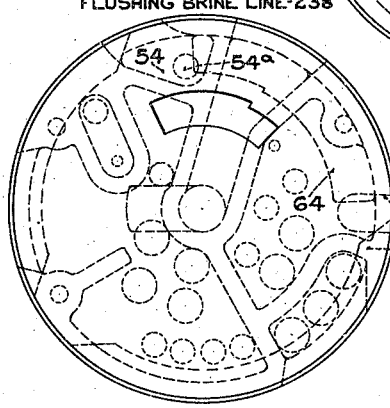
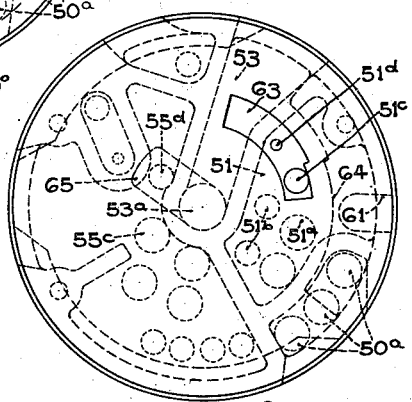
RINSING-280°
Fig.19
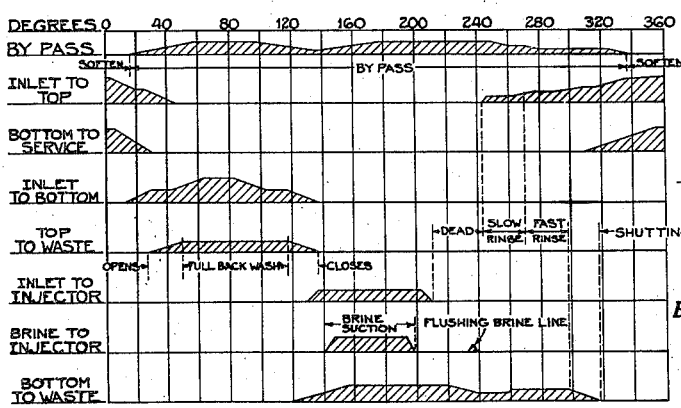
Fig.20
INVENTOR.
Eric Pick
BY
F. Bascom Smith
ATTORNEY Patented Aug. 25, 1936

2,052,515

UNITED STATES PATENT OFFICE 2,052,515

WATER SOFTENING APPARATUS

Eric Pick, New York, N. Y., assignor to The Permutit Company (1934), Wilmington, Del., a corporation of Delaware Application January 20, 1933, Serial No. 652,631

18 Claims. (Cl. 210—24)

This invention relates to apparatus for softening water, and more particularly to a water softener of the zeolite type.

One of the objects of the present invention is to provide a novel water softener which is so constructed as not to require the manual actuation of valves in its operation and use, thereby eliminating the necessity for personal supervision.

Another object of the invention is to provide a water softener embodying novel unitary valve mechanism which is so constructed as to control and direct all flow to and from said softener, and to maintain at all times a flow connection between a source of water supply and a point of use.

Another object is to provide a water softener having novel means for actuating a flow control valve, said means being adapted for installation and removal as a unit, thereby facilitating servicing of the same.

Another object is to provide novel flow control means for water softening apparatus whereby the brine passages of the flow system are flushed after each regeneration of the water softening material in a novel manner.

A further object is to provide a water softener including a salt tank having novel means so constituted that a careless operative, when supplying said tank with salt, cannot interfere with the proper operation of the float therein.

A still further object is to provide a novel method of operating water softening apparatus of the type wherein water is passed through a zeolite, the control of the rate of backwashing and of rinsing being of particular importance.

Another object is to provide novel control means for a water softener of the semi-automatic type which is so constructed that, as will be understood by those skilled in the art, the softener may be readily converted into a fully automatic apparatus by means of the association therewith of a water meter or a time clock, the apparatus being of extremely simple construction and compact design.

The above and further objects and novel features of this invention will appear more fully from the accompanying drawings and the following detailed description. It is to be expressly understood, however, that the drawings are for the purpose of illustration only and are not designed as a definition of the limits of the invention, reference being had for this purpose to the appended claims.

In the drawings wherein like reference characters refer to like parts throughout the several views.

Figure 2:
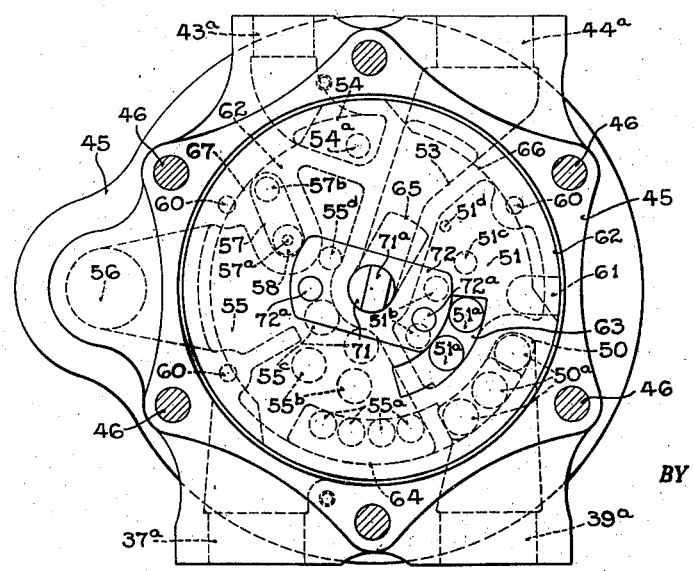
Fig. 2 is a top plan view of a novel valve mechanism, with the cover and valve spring removed, which may be employed in carrying out the invention, the view being taken on line 2—2 of Fig. 11, except that the valve stem and the valve body are shown in plan.
Figure 3:
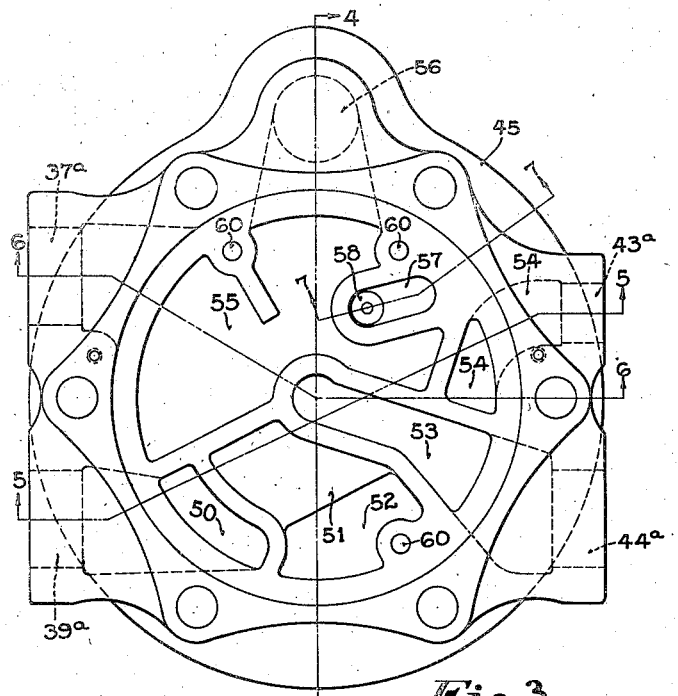
Fig. 3 is a top plan view of the body portion of the valve mechanism illustrated in Fig. 2.
Figure 4:
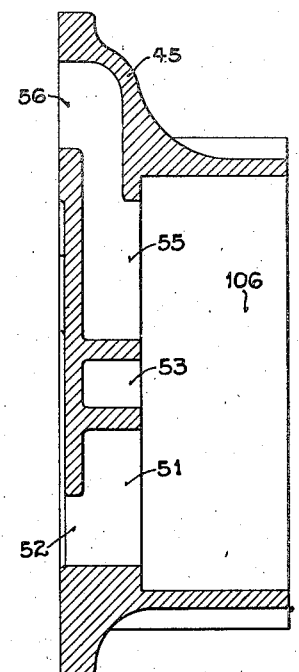
Figure 5:
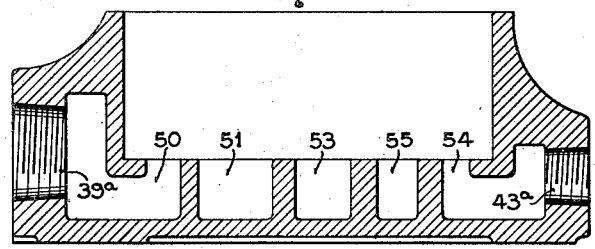
Figure 6:
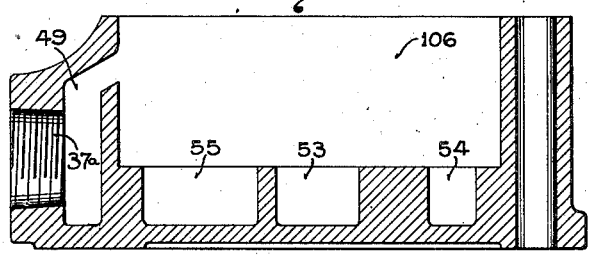
Figure 7:
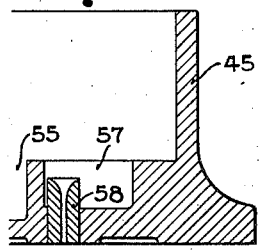
Figure 12:
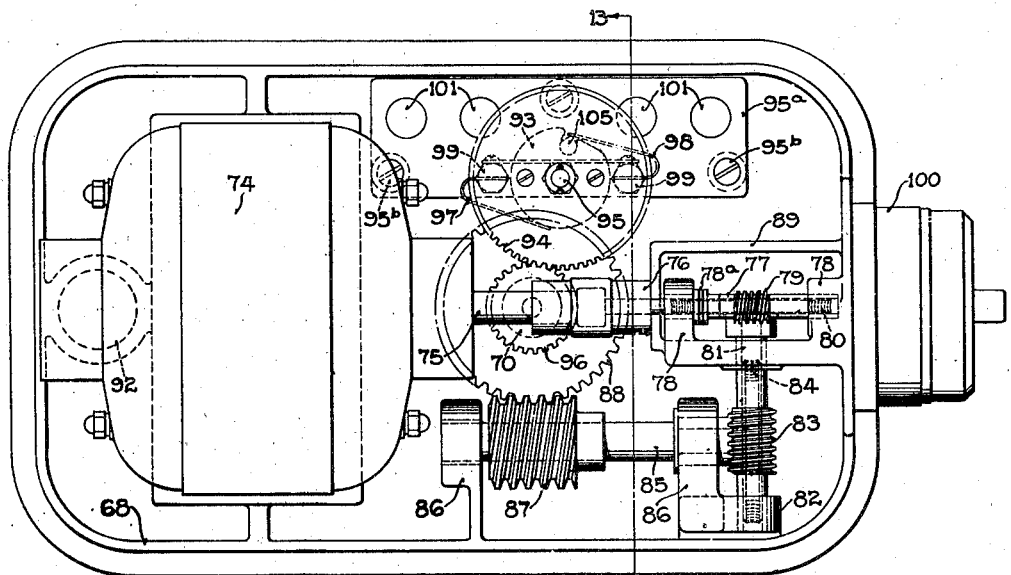
Figure 13:
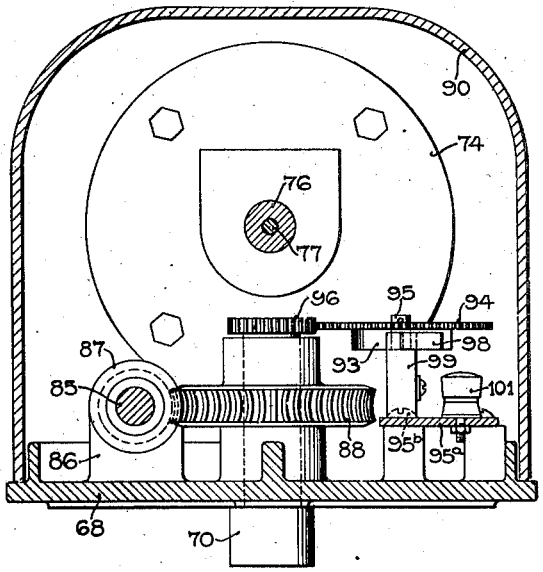
Figure 14:
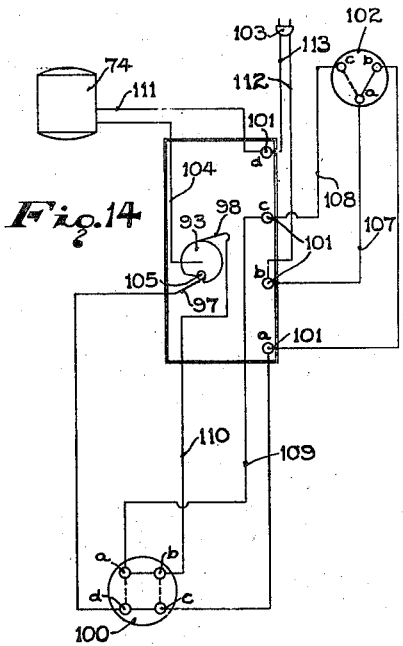

Figs. 4, 5 and 6 are sectional views taken on lines 4—4, 5—5 and 6—6, respectively, of Fig. 3;

Fig. 7 is a partial sectional view taken on line 7—7 of Fig. 3;

Fig. 8 is a top plan view of the rotatable member of the valve mechanism;

Fig. 9 is a sectional view taken on line 9—9 of Fig. 8;

Fig. 10 is a top plan view of one form of stationary disc that may be employed in the valve mechanism;

Fig. 11 is a side elevation, partly in section and with parts broken away, of the valve mechanism shown in Fig. 2 together with one form of power means for actuating said mechanism;

Fig. 12 is a top plan view of the power means with its cover removed;

Fig. 13 is a front elevation, partly in section, taken on line 13—13 of Fig. 12;

Fig. 14 is a diagrammatic showing of one form of means which may be employed for controlling the power means;

Figs. 15 to 19, inclusive, are plan views of the central portion of the valve mechanism of Fig. 2 showing the rotatable member thereof in various operating positions; and Fig. 20 is a graph of the flow connections as established by the valve mechanism during one revolution of the rotary member thereof.

In the form shown, the present invention is embodied in apparatus which includes a softener tank and a salt tank. Novel unitary valve mechanism including a rotatable member is mounted on the upper end of the softener tank. The rotatable member is adapted to control the flow through the flow system of the apparatus during softening and reconditioning, which latter preferably includes backwashing, regeneration, flushing of the brine passages, rinsing, and return to softening; and said member is adapted to be driven, at a uniform rate and without interruption during the reconditioning cycle, by novel power means mounted on and above the valve mechanism and removable therefrom as a unit.

One complete revolution of the rotatable member is required for reconditioning the apparatus and returning the same to softening operation, the flow paths being successively changed during the uninterrupted revolution of said member. By reason of the continuous rotation of the rotatable member, the flow rate during a given step in the reconditioning cycle may be progressively increased or decreased, or maintained substantially constant, as desired. Additionally, the rotatable valve member cooperates with a multi-port stationary member in such a manner that there is maintained, at all times during the operation and reconditioning of the softener, a flow connection between a source of water supply and a point of use. The power means has associated therewith control mechanism so constituted that the former may be set in operation at any desired time by manual actuation of a suitable switch or, if desired, the latter may be automatically actuated by a water meter or time clock. The control mechanism also includes means whereby the rotatable member is automatically stopped when the flow for softening is reestablished following a reconditioning cycle.

Figure 1:
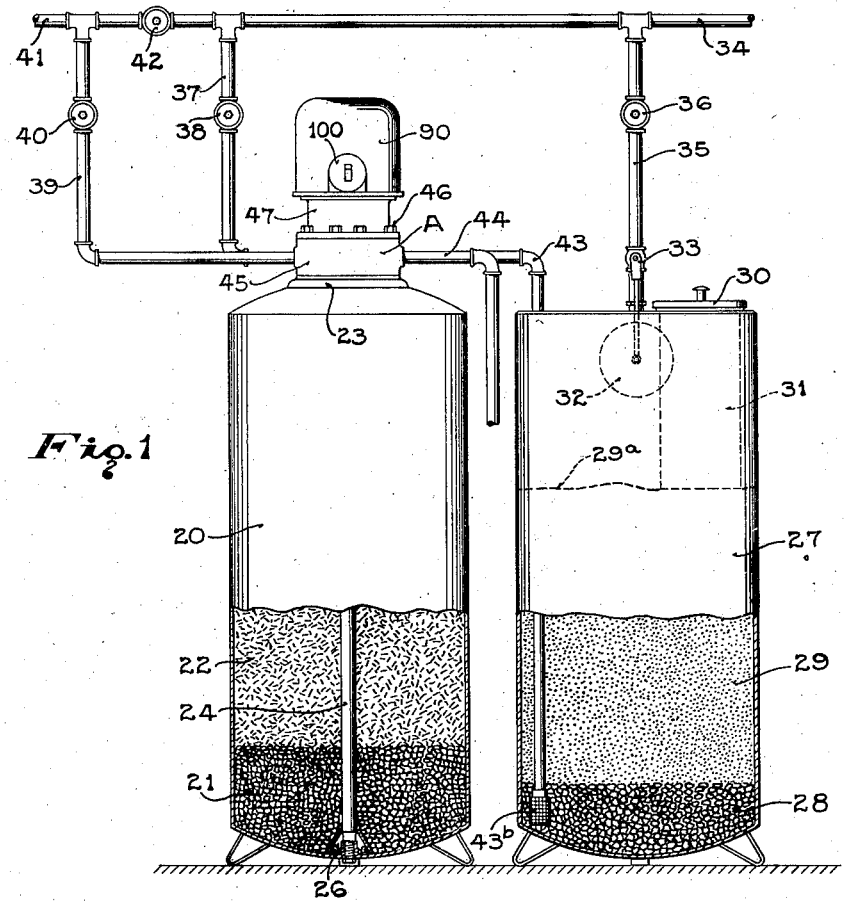
Fig. 1 is a front elevation, partly in section and with parts broken away, of a water softening apparatus embodying the present invention.

Referring to Fig. 1, the apparatus illustrated comprises a cylindrical tank or container 20 having a layer of gravel 21 in the bottom thereof and a bed of water softening material 22, such as zeolite, above the gravel. Mounted on top of tank 20 and covering a central opening therein is a plate 23 (Fig. 11) preferably formed as a forging and having the periphery thereof welded or otherwise suitably secured to the portion of the tank head immediately surrounding said opening. A flow connection to the bottom of tank 20 is formed by means of a pipe 24, the upper end of which is rolled or otherwise tightly fitted into an opening 25 in plate 23 closely adjacent the periphery of the latter. Pipe 24 extends downwardly and is bent in such a manner that the lower end of the same is centrally disposed in the lower portion of tank 20 and extends into a distributor 26 of a suitable type adapted to permit free passage of liquid to and from the lower end of said pipe while preventing the passage of solid material into the pipe.

Adjacent softener tank 20 is a salt tank 27 which preferably has a layer of gravel 28 in the bottom thereof and a supply of salt 29 above the gravel. The salt is introduced into tank 27 through an opening in the top thereof, which opening is closed by a removable cover 30 fitted over a sleeve 31 that has flanged engagement with the top of tank 27 and extends downwardly therein for a short distance below a float 32 adapted to actuate a valve 33. When salt is poured through sleeve 31 into tank 27, the level 29a of the salt cannot rise substantially above the lower end of the sleeve and, accordingly, a careless operative cannot pour such a quantity of salt into tank 27 as to interfere with the operation of float 32.

Hard water is supplied to the softener flow system through a pipe 34. A branch pipe 35 fitted with a stop valve 36 is connected to pipe 34 and salt tank 27. Normally, valve 36 is open and the flow of water into salt tank 27, to form the necessary brine, is automatically controlled by float actuated valve 33. An inlet pipe 37 fitted with a stop valve 38 conducts water from supply pipe 34 to the novel valve mechanism A to be described hereinafter and thence to the softener tank 20. An outlet line constituted by pipe 39 and fitted with a stop valve 40 leads from the valve mechanism A on the softener tank to pipe 41 which constitutes the line to service, or the point of use. A normally closed by-pass valve 42 is provided in pipe 34, 41, intermediate the connections for pipes 37 and 39, for completely by-passing the softener when desired. A brine line 43 having the lower end thereof fitted with a suitable strainer 43b and extending to a position within the layer of gravel 28 in the salt tank is connected at its upper end to valve mechanism A, and a waste pipe 44 is also connected to said mechanism closely adjacent the connection for the brine line.

The novel valve mechanism A is adapted to direct the flow to and from the softener tank, and through the various passages of the flow system for carrying out the steps of reconditioning, the mechanism being so constructed that all flow in the system passes therethrough and the necessity for manual operation of valves is eliminated. The rotary member of the valve mechanism is actuated without interruption through 360° at a uniform rate, during reconditioning, and hence each step of the latter covers a predetermined time interval, it being pointed out that hard water is supplied to service through said valve mechanism at all times during the reconditioning steps, and that the rate of flow is controlled during each step.

In the form shown, the valve mechanism comprises a valve housing which includes a lower housing member 45 (Figs. 2 to 7, inclusive, and 11) that is preferably formed as a casting resting, with an interposed gasket 45a, on disc 23 and being secured thereto as by means of bolts 46 (Figs. 1 and 2). The upper end of member 45 is closed by a cup-shaped housing member 47, the bottom 48 thereof forming a cover for, and resting upon the upper end of, member 45 and being secured thereto, as by means of the bolts 46, with an interposed gasket 48a.

Four openings are provided in the side walls of member 45 (Figs. 2 and 3), into which the pipes 37, 39, 43 and 44, referred to above, extend, said openings preferably having the walls thereof threaded and being designated as 37a, 39a, 43a and 44a, respectively.

Member 45 is also provided with a plurality of passages and compartments, certain of which communicate with the four openings just referred to and others communicate, in a manner to be described hereafter, with the top and bottom, respectively, of the softener tank through opening 23' in disc 23 and the pipe 24. As shown, seven compartments are provided in member 45 as follows (Figs. 2 to 7, inclusive): compartment 49 (Fig. 6), through which hard water is introduced from the inlet pipe 37 into the valve housing; compartment 50, through which soft water passes from the valve housing to outlet pipe 39 during normal softening operation, and through which hard water passes to service during reconditioning; compartment 51 which is in communication at all times through passage 52 and opening 23' with the top of the softener tank, and through which hard water flows during normal softening operation; compartment 53 which communicates with waste pipe 44 and through which waste water flows to the drain during the steps of backwashing, regeneration and rinsing; compartment 54 which communicates with pipe 43, and through which brine is drawn from salt tank 27 in a manner to be more fully described hereafter; and compartment 55 which communicates through passage 56 with pipe 24 leading to the bottom of the softener tank. During softening, soft water flows upwardly through pipe 24, passage 56 and into compartment 55, the communication of the latter with outlet pipe 39 being described more fully hereafter. Additionally, there is provided a compartment 57 in the lower wall of which is fitted an injector outlet nozzle 58, for delivering brine, during regeneration, through opening 23' into the top of the softener tank, as will be pointed out more fully hereafter.

The upper walls of the above-named compartments are constituted by a bronze disc 59 (Figs. 10 and 11) which rests with an interposed gasket 59a on an annular shoulder provided in member 45 and which is secured thereto against rotation by means of pins 60 (Fig. 2) fitting into openings 60a in disc 59 (Fig. 10). Disc 59 thus constitutes a partition that divides the valve housing into upper and lower portions, and is provided with a plurality of circular openings forming passages between the various compartments and the upper portion, or hard water chamber 106 (Fig. 11), of the valve housing. For convenience of description, each opening is designated by a numeral and a small letter, the numeral corresponding to the compartment with which the opening communicates. For example, circular openings 50a communicate with compartment 50, and openings 51a, 51b, 51c and 51d communicate with compartment 51, etc. In addition to the circular openings, disc 59 is provided in the upper surface thereof and adjacent the periphery with a short radial passage 61.

In order to control the flow of water from the upper portion, or hard water chamber 106, of the valve housing through the openings in disc 59 to the various compartments, there is provided a rotatable valve member 62 (Figs. 8, 9 and 11) which is preferably formed as a hard rubber disc having a diameter somewhat less than the inner diameter of member 45. Valve member 62 is provided with an arcuate opening 63 through which hard water may flow from chamber 106, through the desired openings in disc 59, and into the proper compartments in member 45; an arcuate recess 64 in the lower face of the valve member coacts with openings in disc 59 to establish communication between certain of the compartments; a recess 65 in the lower face of the valve member, extending radially from the center thereof, is adapted to constitute, together with certain openings in disc 59, a passage from compartments 51 and 55 to the waste pipe 44; and two arcuate grooves 66 and 67 in the lower face of said valve member, at its periphery, permit the flow of hard water to service, through compartment 50, when in register with openings 50a in disc 59. Suitable resilient means, such as valve spring 62', is preferably interposed between valve member 62 and cover 48 to insure close engagement between said member and disc 59 at all times.

Novel means are provided for withdrawing brine from the salt tank and injecting the same into the top of the softener tank. In the illustrated embodiment, such means are constituted by injector outlet nozzle 58 mounted in the base of housing 45 (Fig. 7). The injector outlet nozzle extends upwardly into compartment 57 and has a central passage in vertical alinement with an injector inlet nozzle 57a formed in stationary disc 59, the upper end of said passage being conically enlarged and the lower end thereof opening into the top of the softener tank. Disc 59 is provided with an opening 57b through which brine is adapted to be drawn into compartment 57 in a manner to appear hereafter.

Novel power means are provided for rotating valve 62 through 360 degrees to recondition the softener and restore it to normal softening operation. The power means, as shown, includes an electric motor and reduction gearing adapted to drive the valve member continuously at a speed such that approximately one hour is required, in one commercial embodiment of the invention, to recondition the softener and, this, without necessity for personal supervision, and said means is so constructed that the same may be installed and removed as a unit to facilitate inspection, assembly and repair.

As illustrated, the power unit comprises a base plate 68 mounted on, and secured to, the upper end of casing member 47 as by means of screws (not shown) which engage suitable lugs 69 on said member. Rotatably mounted in plate 68 and extending downwardly therefrom, within member 47, is a vertical driving shaft 70 adapted to engage a stem 71 having a head 72 on the lower end thereof, which latter is detachably and drivably connected to valve member 62 as by means of two pins 72a that engage holes in head 72. Pins 72a are advantageously moulded into the hard rubber valve member 62, and the embedded portion of each pin is formed with a knurled section and a groove, whereby the pins are securely held in said valve member. Stem 71, which preferably extends through a packing gland 73 carried by the upper housing wall 48, is provided at its upper end with an eccentric tongue 71a of reduced section that extends into an off-center recess in the lower end of shaft 70 to establish the driving connection therebetween, and to render it impossible to improperly assemble the shaft and stem.

An electric motor 74 is secured to the upper surface of base plate 68 with the armature shaft 75 thereof horizontally disposed, and a reduction gear train is interposed between shafts 75 and 70 whereby the latter is driven at a reduced speed. In one commercial embodiment of the softener, it has been found desirable to make the speed reduction 120,000 to 1.

Shaft 75 is drivably connected by means of a suitable coupling 76 to a shaft 77 rotatably mounted in bearing brackets 78 carried by the base plate. Intermediate the brackets, shaft 77 has secured thereto a ball thrust bearing 78a and a worm 79 which meshes with a worm wheel 80 carried by a shaft 81 that is disposed at right angles to shaft 77, and is rotatably mounted below the latter in bearings formed in a vertically disposed arm 82 and the support for brackets 78. It will be noted that the high speed worm gear 80 is positioned within an oil basin 89 (Fig. 12) that is preferably provided with a suitable cover (not shown). Shaft 81 carries a worm 83 that meshes with a worm gear 84 drivably connected to a shaft 85 that is rotatably mounted in upright bearing brackets 86, the shaft 85 being parallel to, but below and laterally spaced from, shaft 77. A worm 87 carried by shaft 85 meshes with a worm gear 88 which is drivably secured to vertical shaft 70. A cover 90 for the motor and reduction gearing is removably secured in any suitable manner to the base plate and is provided with an opening 91 (Fig. 11) in the front thereof through which projects an element of the control mechanism.

Electrical leads for the motor pass through an opening 92 in the base plate.

The novel control mechanism for the power means is so constituted that the only manual effort required to recondition the softener is the throwing of a switch positioned on or adjacent the softener, or a remotely located switch which, in a household installation, may be located in the kitchen for example. After the reconditioning and return to softening, i. e., after the valve has made one complete revolution, the control means is effective to automatically deenergize the motor. The control, in the form shown, is thus semi-automatic but may be readily changed by means of a meter or time clock to full automatic.

As illustrated, the control means comprises a metal cam 93 (Figs. 12, 13 and 14) secured to a gear 94 made of electrically insulating material such as synthetic rosin and rotatably mounted on a vertically disposed stub shaft 95 carried by an insulating plate 95a which is secured by means of screws 95b to base plate 68. Gear 94 is driven by a pinion 96 drivably connected to the upper end of shaft 70. The diameter ratio of the pinion and gear is 1:2 so that cam 93 is rotated through 180° while shaft 70 and valve member 62 are turned through 360°. A pair of resilient contacts 97 and 98, carried by posts 99, have the free ends thereof in sliding engagement with the periphery of cam 93 and are connected through suitable leads (Fig. 14) to a four-way, hand-operated switch 100 carried by base plate 68 and projecting through opening 91 in cover 90. Switch 100 is connected through suitable leads and binding posts 101 to a remotely located three-way switch 102 and to a power plug 103 adapted to be inserted in an electrical outlet. Plug 103 has one lead therefrom connected to motor 74 and the latter is connected through lead 104 to cam 93 which is free to rotate without interrupting its electrical connection with said lead 104.

The control circuit shown is such that the motor may be energized by actuating either of the switches 100 or 102 which are connected in series. With the latter in the full line positions indicated in Fig. 14, the circuit is interrupted at contact 97 which is in engagement with an insulating plug 105 fitted into a recess in the periphery of cam 93. If switch 102 is now thrown to the left, to dotted line position, current will flow from plug 103 through lead 112, binding post 101b, lead 107, switch contacts 102a and 102c, lead 108, post 101c, lead 109, switch contacts 100a and 100b, lead 110, contact 98, cam 93, lead 104 to the motor and back to plug 103 through lead 111, post 101d and lead 113. On the other hand, if the remote control switch 102 is meter or clock actuated, or if it is more convenient, the circuit may be closed by turning switch 100 to the dotted line position, switch 102 remaining in the full line position shown, a similar circuit will be closed through contacts 102a and b, contacts 100c and b and contact 98. After a half revolution of cam 93, the resiliency of contact 98 moves the same into engagement with plug 105 (Fig. 12), thereby breaking either of the above circuits and stopping the motor. One of the switches will now be in dotted line position so that actuation of either will close a circuit to the motor through contact 97 which is now in engagement with the cam 93. It will be seen that contacts 97 and 98 and cam 93 constitute a three-way motor actuated switch which is electrically connected in series with switches 100 and 102.

A time clock may be employed to actuate switch 102 to recondition the softener at predetermined intervals, or said switch may be actuated by a water meter, installed in the soft water outlet line 39 as will be readily understood by those skilled in the art, for reconditioning the softener after a predetermined quantity of water has passed through tank 20, thereby rendering the softener fully automatic.

It is now desirable to trace the flow of water and brine through the flow system during softening and the various steps of reconditioning, for which purpose reference will be had primarily to the graph of Fig. 20 and to Figs. 15 to 19, inclusive. In the graph, the volume of flow through the valve is measured along the axis of ordinates, and the angular position of valve member 62 from softening position is measured along the axis of abscissas. Since member 62 moves at a uniform speed, duration of flow may also be measured along the latter axis. For convenience, each curve has been descriptively named to indicate flow through the valve mechanism, that is, the "By-pass" curve indicates the flow of water from the source through the valve mechanism to service, by-passing the softener tank; "Inlet to top" indicates flow from the source of supply through the valve mechanism into the top of the softener tank; "Bottom to service" indicates flow from the bottom of the tank, up through pipe 24 and the valve mechanism to service line 39; "Inlet to bottom" indicates flow from the source through the valve mechanism and pipe 24 into the bottom of the tank; "Top to waste" is descriptive of the flow upwardly through the zeolite, out the top of the tank, and through the valve mechanism to waste; "Inlet to injector" and "Brine to injector" represent flow from the source of water and brine supplies, respectively, to the injector; and "Bottom to waste" represents flow from the bottom of the softener tank, upwardly through pipe 24 and the valve mechanism to waste.

*Softening.*—The valve member 62 is in 0° position, i. e., the position shown in Figs. 2 and 15, during softening, and is stationary, the circuit to the motor being open. As shown by the curves "Inlet to top" and "Bottom to service", a maximum amount of hard water is being delivered to the softener tank and a maximum of soft water to service. The hard water flows from pipe 34 through inlet pipe 37 into compartment 49 (Fig. 6) and upwardly into the hard water chamber 106 constituted by the space between valve member 62 (Fig. 11) and the upper part of housing 45, 48. From the chamber, the water flows downwardly through opening 63 (Fig. 15) in the rotary valve member, through openings 51a in disc 59, thence through compartment 51 (Fig. 11), opening 52, opening 23' into the top of softener tank 20, downwardly through the bed of zeolite 22 and gravel 21 (Fig. 1), into distributor 26, up through pipe 24, opening 56 in member 45 (Fig. 11), compartment 55, upwardly through openings 55a in disc 59 into the arcuate recess 64 in the bottom of valve member 62 (Figs. 8 and 15), thence laterally and then downwardly through openings 50a into compartment 50, and through soft water outlet pipe 39 to service line 41.

After a quantity of water has been softened such as to exhaust the zeolite bed in tank 20, switch 100, or 102, is thrown, whereupon the motor is energized and the rotary valve member actuated to recondition the softener. As the rotary valve member moves clockwise from 0° position, it gradually closes the two openings 51a in disc 59 so that the supply or volume of soft water is diminished and, when the valve has moved through an angular distance of approximately 15°, passage 63 registers with circular opening 55b to permit water to flow from chamber 106, above valve member 62, into compartment 55 and down through pipe 24 to the bottom of the tank as indicated by the curve "Inlet to bottom". Shortly thereafter, at approximately the 18° position, as indicated by the bypass curve, groove 66 registers with the first of the openings 50a to permit hard water to flow from chamber 106 to compartment 50 and out pipe 39, whereby hard water is by-passed to service.

*Backwashing.*—When the rotary valve member, which is being continuously actuated by the power means, reaches a position of approximately 25°, the recess 65 therein begins to register with the first opening 51b (two such openings are provided), thus opening the "Top to waste", whereupon backwashing is started. Member 62 is shown in a representative full backwashing position, i. e., at about 60°, in Fig. 16, the flow of water being from hard water chamber 106, through opening 63 in member 62, openings 55b in disc 59, compartment 55, passage 56, pipe 24, and distributor 26 into the bottom of tank 20, thence upwardly through zeolite bed 22 to loosen and cleanse the same, through opening 23', passage 52, compartment 51, openings 51b, recess 65, opening 53a, compartment 53 to waste pipe 44. Backwashing continues until member 62 has turned through approximately 138°, at which time passage 63 and recess 65 move out of registry with openings 55b and 51b, respectively. Attention is called to the fact that the backwashing is carried on at a constant rate from approximately the 50° position of the valve to the 118° position as shown by the curve "Top to waste". This desirable result is secured by locating openings 51b so that the distance between the centers thereof is equal to the width of recess 65.

After backwashing, brine solution is passed through the zeolite bed to regenerate or restore the water softening qualities of the latter. As the valve ports which permit backwashing are gradually being closed, passage 63 uncovers injector inlet nozzle 57a in disc 59 (at approximately the 130° position of the valve member), thus permitting water to flow from chamber 106 into injector outlet nozzle 58 at a high velocity, the flow being represented by the curve "Inlet to injector". Fluid in compartment 57 is entrained by the flow of water through the injector, thus creating a vacuum in said compartment.

*Regeneration.*—The step of regeneration is actually started when recess 64 uncovers opening 54a at about the 140° position, thus establishing a flow connection from brine tank 27 to injector compartment 57 as shown by the curve "Brine to injector". Since flow through injector outlet nozzle 58 has been established for an appreciable interval prior to the opening of the brine inlet, the brine is immediately drawn into compartment 57 and injected into the zeolite bed, eliminating any possibility of the water backing up in the brine passages.

For the flow path during regeneration, reference will be had to Fig. 17 in which valve member 62 is shown at approximately the 160° position, at which time water from chamber 106, due to the pressure in the supply line 34, 37, passes downwardly through injector inlet nozzle 57a into injector outlet nozzle 58. Brine is now drawn from tank 27 through brine pipe 43, compartment 54, opening 54a, recess 64, opening 57b into compartment 57, whence it is entrained by the flow of water through the injector and carried through injector outlet nozzle 58 into the top of tank 20. At this time, recess 65 is in register with openings 55c in disc 59, thus establishing a flow connection from "Bottom to waste" so that the brine entering the top of tank 20 passes downwardly through zeolite bed 22, into distributor 26, upwardly through pipe 24, passage 56, compartment 55, and openings 55c into recess 65, thence down through opening 53a into compartment 53 and out to the drain by way of pipe 44. Brine ceases to flow to the injector at about the 200° position of the valve member, when recess 64 moves out of register with opening 57b.

It is desirable in the reconditioning of water softeners of the zeolite type to delay the rinsing operation for an appreciable interval after each regeneration. Accordingly, in the illustrated embodiment of the invention, the brine filled zeolite bed is undisturbed during the rotation of valve member 62 from approximately 210° to 243°, representing, in the present commercial installation, a time interval of about five minutes. Preferably, the valve member is effective during this interval to control the necessary step of washing out or flushing the brine passages in order that brine trapped in compartment 54 and in line 43 may not corrode the surrounding metal and leave salt deposits thereon.

*Flushing brine passages.*—This step is carried out as indicated by the curve labeled "Flushing brine line", while the valve member is moving from approximately the 233° to the 239° position. Valve member 62 is shown in position for flushing the brine passages in Fig. 18. This operation is started when recess 64 registers with groove 61 in disc 59, permitting water from chamber 106 to flow from groove 61 upwardly into recess 64, thence through opening 54a to compartment 54, and out to the brine tank 27, through line 43. Flow in this path ceases when opening 54a is closed by rotation of valve member 62 to the 239° position. It will be noted that the step of flushing prevents brine from being discharged from recess 64 into the service line through openings 50a when said recess comes into register therewith.

*Rinsing.*—It is now necessary to rinse the brine from the zeolite bed, and it has been found that best results are obtained by rinsing slowly at first and increasing the rate gradually to a suitable maximum. This slow and fast rinse procedure, which is graphically illustrated by the curve "Inlet to top", starting at 242°, is highly desirable and results in increased capacity of the zeolite.

The slow rinse begins when passage 63 registers with the small opening 51d at which time recess 65 is in partial register with openings 55c and 55d. A few degrees later, passage 63 uncovers openings 51c and 51a in succession to permit a gradual increase in the volume of flow. Referring to Fig. 19 which illustrates valve member 62 in intermediate position, during the rinsing operation, at approximately the 280° position, the flow of water is from chamber 106, through passage 63, openings 51c and 51d, compartment 51, passage 52, and opening 23' into the top of tank 20. Thence, rinsing water flows down through the zeolite bed 22 washing out the brine, into distributor 26, upwardly through pipe 24, passage 56, compartment

6   2,052,515

55, opening 55d, recess 65 and through opening 53a, compartment 53 and pipe 44 to drain.

The rinsing operation ceases when recess 65 moves out of register with opening 55d at about the 318° position. Simultaneously with the closing of opening 55d, flow from "Bottom to service" is being again established by the registration of recess 64 and openings 50a and 55a, and softened water is again available at the point of use.

In order that the supply to service will not be cut off during the reconditioning, hard water is supplied to service as indicated by the "By-pass" curve, beginning at 18° when groove 66 moves into registration with the first opening 50a. Just before groove 66 moves out of registration with the last of holes 50a, companion groove 67 uncovers the first of said holes. An additional by-pass connection is made through groove 61 and recess 64 as soon as the latter registers with openings 50a and groove 61, and continues until said recess 64 moves out of registration with the groove 61 at 336°. Figs. 16, 18 and 19 show positions of the valve member when grooves 66 and 67 and recess 64, respectively, are effective to by-pass to service.

It will be noted from the upper three curves of Fig. 20 that from 338° through 0° position to 18°, soft water only will flow to service; from 18° to 30° and from 310° to 338°, a mixture of hard and soft water will flow to service; and between 30° and 310°, hard water only is available for use.

When the continuously moving valve member 62 has made one complete revolution, returning again to softening position (Fig. 15), cam 93 will have made one-half a revolution permitting the circuit closing contact 97 or 98, as the case may be, to ride over the lip on the cam and snap into engagement with insulating plug 105. The circuit to motor 74 is thus automatically broken and valve member 62 comes to rest in softening position.

The control unit has been so designed that any number of successive reconditioning cycles may be brought about without interruption of the movement of member 62, in the event the softener has been consistently overrun. In the illustrated embodiment of the control circuit (Fig. 14), two successive reconditioning cycles are brought about by snapping either switch 100 or 102 twice, allowing a sufficient interval between the switch operations for contact 97 or 98, respectively, to ride off of insulating plug 105 and engage cam 93. This interval is small due to the irregular periphery of plug 105. The first switch operation closes a circuit through the one contact whereas the second switch operation transfers the flow of current to the other contact, which current will not be interrupted until cam 93 has made one complete revolution, bringing said other contact into engagement again with plug 105. During this time, valve member 62 will make two revolutions, thus completing two successive reconditioning cycles. If the softener has been rendered fully automatic, a reconditioning cycle may be initiated out of the regular routine operation by merely actuating switch 100.

There is thus provided a novel water softener, wherein the flow system is controlled by a unitary valve mechanism, the latter being actuated by unitary power means which is readily installed or removed for servicing. As will be seen by those skilled in the art, the valve mechanism and the power means may be employed to convert softeners of the manually operated type now in use into semi-automatic softeners. Accordingly, it will be understood that while there has been illustrated and described a down-flow zeolite softener of the household type, the invention is not limited thereto.

The commercial form of softener illustrated is inexpensive to manufacture and is extremely compact in design. The novel method and means disclosed for handling the brine and for by-passing hard water to service greatly reduce the number of parts required, thereby reducing manufacturing assembly and maintenance costs. The method of regenerating the zeolite, comprising the steps of inserting brine, shutting off the flow, slow rinsing and final fast rinsing, results in increased capacity of the zeolite and, hence, improved efficiency of the apparatus. The fact that the flow to service is never shut off in any position of the valve mechanism is a great convenience to the user and does away with any "water hammer" in the service line resulting from sudden stopping or starting of flow. While the rotary valve element and the stationary disc have been illustrated in their commercial forms, it will be readily understood that various changes may be made therein, particularly in the materials thereof and in the arrangement and size of the openings, passages, etc. Various other changes may be made in the arrangement of parts and details of construction as will now readily occur to those skilled in the art. Reference will, accordingly, be had to the appended claims for a definition of the limits of the invention.

What is claimed is:

1. In water softening apparatus, the combination with a container for water softening material, a flow system adapted to establish flow connections between said container and a source of water supply, a source of regenerating material, a drain, and a point of use, of valve mechanism including a valve casing forming a chamber, a flat stationary seat in said chamber having a plurality of ports therein, a connection between said water supply and said chamber and a disc-like rotary valve member in said chamber rotatable on said seat and having recesses in the face thereof and an opening therethrough adapted to cooperate with said ports, during each complete revolution of said valve member, to maintain in all positions thereof an uninterrupted flow connection from the source of water supply to a point of use, and to direct flow from the source of water supply and the source of regenerating material through the container to recondition the material therein, and means for actuating said rotary valve member.

2. In water softening apparatus, the combination with a container for water softening material, a tank for a regenerating solution for said softening material, and conduits for passing water through said container and delivering said solution from said tank into said container, of valve mechanism including a rotary valve member having a single opening therethrough for controlling the flow in said conduits and attached to the top of the container and adapted to deliver hard water directly into said container, unitary driving means removably mounted on said mechanism for turning the valve member, without interruption, through one complete revolution, whereby the flow is controlled to regenerate said material, and means for deenergizing said driving means after each revolution of said valve.

3. In a water softener, a container for water softening material, a salt tank, a flow system adapted to establish flow connections between said container, a source of water supply, the salt tank, a drain and a point of use, valve mechanism including a housing mounted on the top of said container, an injector in said housing adapted to discharge into the container, and a rotatable valve member having a single opening therethrough, said member being adapted to control the flow of water through the injector and the flow of brine from the salt tank for an interval predetermined by the rate of rotation of said valve member.

4. In a water sofener, a container for water softening material, a salt tank, a flow system adapted to establish flow connections between said container, a source of water supply, said tank, a drain, and a point of use, valve mechanism for controlling the flow in said system, said valve including a housing, an injector in said housing, a rotatable valve member having an opening therethrough and a recess in the lower face thereof, said opening being adapted to direct water from the source of supply to the injector, and said recess being adapted thereafter to establish a flow connection between the salt tank and said injector, and power means for moving said valve member at a predetermined rate.

5. In water softening apparatus, a brine tank, water supply means connected to said tank, a valve for said supply means, a float in said tank for actuating said valve, and a sleeve supported by, and extending into, said tank through which salt is adapted to be introduced into the tank, said sleeve being laterally spaced from said float and having the lower end thereof extending below a horizontal plane tangent to the bottom of the float when the valve is open.

6. In water softening apparatus having a container for water softening material wherein a flow system is adapted to establish flow connections between said container and a source of water supply, a source of regenerating material, a drain and a point of use, and valve mechanism including a rotary valve member adapted to control the flow in said system, the combination therewith of power means for actuating said rotary valve member, and control means for the power means, said control means including a rotary element driven by said power means for interrupting the circuit for said power means after one complete revolution of the rotary valve member, and means for shunting said rotary element whereby the latter is rendered ineffective during one or more revolutions of the rotary valve member.

7. In a water softener, valve mechanism having a chamber through which passes water from a source of hard water supply, a rotatable valve member in said chamber for controlling the flow therefrom and adapted to maintain an uninterrupted flow to service, and means for continuously rotating said valve member to direct a regenerating agent from associated conduits through the softener, to interrupt the flow through the softener for a substantial interval while flushing said conduits, and to subsequently rinse said agent from the softener.

8. In a zeolite water softener, valve mechanism having a single rotatable valve member, said member being adapted to direct flow through said mechanism and zeolite, power means for continuously rotating said valve member to interrupt the flow of soft water to service and by-pass a portion of the hard water to service while establishing various flow paths for the remainder of hard water to recondition the zeolite, said valve member being adapted to interrupt the by-passing of hard water to service after restoring the flow of soft water thereto, and means for interrupting rotation of the valve member when the flow of soft water to service has been reestablished.

9. The method of operating a zeolite water softener which includes directing a regenerating agent through the zeolite, interrupting the flow of said agent for a substantial interval, and subsequently rinsing said agent from the zeolite at a slow rate for a predetermined interval and then at a high rate for a predetermined interval.

10. The method of operating a zeolite water softener employing valve mechanism having a rotatable valve member which consists in continuously rotating said rotatable valve member to direct the flow for reconditioning the softener, backwashing the zeolite at a substantially constant rate of flow, directing a regenerating agent through the zeolite, and rinsing said zeolite at a slow rate and then at a high rate for an interval predetermined by the rate of rotation of said valve member.

11. The method of reconditioning a zeolite water softener having a chamber through which passes water from a source of hard water supply, which consists in directing water from the supply into said chamber, by-passing a portion of the supply from the chamber to service while employing the remainder of the water received in the chamber to backwash the zeolite and thereafter to introduce brine into said zeolite, retaining the brine in the zeolite for a substantial interval without flow through said zeolite while employing said remainder to back wash the brine passages, and subsequently employing said remainder to rinse the brine from the zeolite.

12. The method of operating a zeolite water softener of the type employing a single rotary valve member to control the flow system of the softener, which consists in directing hard water through the valve member and zeolite to service until the zeolite is exhausted, continuously rotating the valve member to interrupt the flow of soft water to service and continuously by-pass a portion of the hard water to service, employing the remainder of the hard water to recondition the softener, interrupting the by-passing of hard water to service after restoring the flow of soft water thereto, and thereafter interrupting the rotation of the valve member.

13. The method of reconditioning a zeolite water softener of the type employing a single rotary valve member to control the flow system of the softener, which includes by-passing hard water to service, employing the remainder of the hard water controlled by the valve in carrying out the reconditioning while continuously rotating said valve member through one complete revolution, and progressively interrupting the by-passing of hard water to service while initiating the flow of soft water to service.

14. In water softening apparatus wherein water is directed from a source of supply through a container of water softening material to a point of use and wherein said material is adapted to be reconditioned, said reconditioning including the passing of regenerating solution through said material to a drain, the combination with said apparatus of flow control mechanism comprising a housing having direct communication with the top of said container, a single connection only to said housing from each the bottom of said container, said source of supply, a point of use, a drain and a source of regenerating solution, a flat valve seat in said housing, a disc-like rotatable valve member adapted to operatively engage said seat for controlling the flow of water and regenerating solution in said system during each revolution of said member to effect the reconditioning of said water softening material while maintaining at all times during revolution of the valve member a flow connection between said source of supply and point of use, and means for rotating said member.

15. The method of reconditioning a water softener having a flow system including a tank containing zeolite, a brine tank, a hard water supply pipe, a service pipe and valve means to control the flow through said system which comprises passing brine from the brine tank through said valve means to the zeolite tank, retaining a quantity of the brine in the zeolite for a substantial interval without flow through said zeolite tank, passing water from said valve means into the brine tank during said interval and subsequently passing water through the zeolite tank to rinse out the brine.

16. In water softening apparatus wherein valve mechanism is provided for controlling the regenerating cycle and wherein an electric motor is provided for actuating said valve mechanism, the combination with said mechanism and motor of means for controlling the operation of the motor, said means including a conducting member driven by the motor and having an insulated portion, a pair of conductors adapted to engage said insulated portion in succession to open the circuit to the motor, and a switch for closing the circuit to the motor through one of said conductors and the conducting member when the other of said conductors is in engagement with the insulated portion, said insulated portion being of such size that two reconditioning cycles may be brought about in succession by actuating the switch twice with only a short interval of time between the two actuations.

17. In zeolite water softening apparatus in which the reconditioning cycle is controlled by a rotatable valve mechanism driven continuously by an electric motor during said cycle, the combination with said motor of control means therefor including a rotatable conducting disc driven by the motor at a speed half as great as that at which the motor drives the valve mechanism, said disc having a current interrupting portion, a pair of contact members spaced 180 degrees apart with relation to the axis of said disc, each contact member being adapted to engage alternately the disc and the current interrupting portion, a multi-point switch having one point connected with the one contact member and a second point connected with the other contact member, a conductor connecting a third point of said multi-point switch with one pole of a source of electric energy, and another conductor connecting said conducting disc with another pole of said source of electric energy, said electric motor being electrically inserted in one of said two conductors.

18. In zeolite water softening apparatus in which the reconditioning cycle is controlled by a rotatable valve mechanism driven continuously by an electric motor during said cycle, the combination with said motor of control means therefor including a rotatable cam driven by the motor at a speed half as great as that at which the motor drives the valve mechanism, a conductor leading to one pole of a source of electric energy, a pair of contact members adapted to establish electric connection with said conductor and being spaced 180 degrees apart with relation to the axis of said cam, the cam being adapted to disrupt alternately electric connection between the conductor and one of the contact members, a multi-point switch having one point connected with the one contact member and a second point connected with the other contact member, and a conductor connecting a third point of said multi-point switch with another pole of said source of electric energy, said electric motor being electrically inserted in one of said two conductors.

ERIC PICK.